(12) United States Patent
Danziger

(10) Patent No.: US 7,710,547 B2
(45) Date of Patent: May 4, 2010

(54) COHERENT OPTICAL RANGE FINDER

(75) Inventor: Yochay Danziger, Kfar Vradim (IL)

(73) Assignee: Rafael Defense Systems Ltd., Haifa (IL)

( * ) Notice: Subject to any disclaimer, the term of this patent is extended or adjusted under 35 U.S.C. 154(b) by 134 days.

(21) Appl. No.: 11/955,414

(22) Filed: Dec. 13, 2007

(65) Prior Publication Data

US 2009/0128798 A1    May 21, 2009

(30) Foreign Application Priority Data

Dec. 13, 2006    (IL) .................................. 180051

(51) Int. Cl.
*G01C 3/08* (2006.01)
(52) U.S. Cl. .................................. 356/5.01
(58) Field of Classification Search ........ 356/3.01–28.5
See application file for complete search history.

(56) References Cited

U.S. PATENT DOCUMENTS 6,469,778 B2 *  10/2002  Asaka et al. ................ 356/28.5
7,414,705 B2 *   8/2008  Boillot ....................... 356/5.01
2006/0227317 A1 * 10/2006  Henderson et al. ............ 356/28

* cited by examiner

*Primary Examiner*—Thomas H Tarcza
*Assistant Examiner*—Luke D Ratcliffe
(74) *Attorney, Agent, or Firm*—Mark M. Friedman

(57) ABSTRACT

A coherent range measurement system includes a detector optical arrangement defining a current optical field of view and an illumination subsystem configured for transmitting pulses of coherent illumination at different times along each of a plurality of directions within the current optical field of view without moving parts. A detection arrangement is configured to direct part of the transmitted pulses and a reflected signal from each of the directions onto a common detector. The output of the detector is processed by a processing system to derive range data associated with each of the directions by coherent detection of the reflected signals employing the part of the transmitted pulses as a local oscillator.

7 Claims, 5 Drawing Sheets

COHERENT OPTICAL RANGE FINDER

FIELD AND BACKGROUND OF THE INVENTION

The present invention relates to coherent optical range finders and, in particular, it concerns a coherent range measurement system where a single detector is used to detect time-multiplexed signals reflected from a plurality of directions.

Coherent laser range detection is based on interference of two light beams on a detector. The first light beam originates directly from a laser (defined as the "local oscillator") while the second light beam is the reflection from a laser illuminated target (defined as the "signal"). This method is very sensitive and even weak reflections from the target can be detected. This method is also characterized by being very insensitive to background radiation.

Unfortunately, this method requires a very complicated and expensive optical setup. Utilization of optical fibers somewhat reduces the complexity and improves robustness.

An optimal receiver that uses polarization splitters and balanced receivers can achieve shot noise limited performance. However, this receiver is complicated and expensive.

Present coherent range detection systems are expensive; therefore, direct detection methods are used whenever possible.

An example of prior art coherent receiver is presented in FIG. 1.ced1 A continuous laser source 5 is modulated to pulses by a modulator 10, and the pulses are then amplified 15 and pass through the circulator 20 to be transmitted by optics 25. The received signal from the target is collected by optics 25 and directed by circulator 20 to a different path 30 onto the coherent receiver 35. Some of the light from the continuous laser 5 is coupled 40 directly onto the coherent receiver in order to generate interference. The receiver 35 can include polarization splitters and balanced receivers in order to achieve optimal detection.

This system is complicated and expensive. The use of separate modulator (not modulated laser) and interfering CW light with pulsed signal dictates expensive components.

An alternative approach has been suggested in U.S. Pat. No. 6,469,778 to Asaka et al. which is hereby incorporated by reference in its entirety. Asaka et al. proposes splitting the transmitted illumination pulse and using a part of the radiation as a local oscillator for coherent detection.

There is a need for a coherent detection system which is simple, inexpensive and can be scalable to multiple transmitters and receivers even at the price of non-optimal operation.

SUMMARY OF THE INVENTION

The present invention is a coherent range measurement system where a single detector is used to detect time-multiplexed signals reflected from a plurality of directions.

According to the teachings of the present invention there is provided, a coherent range measurement system comprising: (a) a detector optical arrangement defining a current optical field of view; (b) an illumination subsystem configured for transmitting pulses of coherent illumination at different times along each of a plurality of directions within the current optical field of view without moving parts; (c) a detection arrangement including a detector sensitive to the coherent radiation, the detection arrangement being configured to direct part of the transmitted pulses and a reflected signal from each of the directions onto the detector; and (d) a processing system associated with the detection arrangement and configured to process an output of the detector to derive range data associated with each of the directions by coherent detection of the reflected signals employing the part of the transmitted pulses as a local oscillator.

According to a further feature of the present invention, the pulses of coherent illumination transmitted along the plurality of directions originate from a single pulsed laser source, and wherein a time delay between the pulses is introduced by an optical path difference between paths traveled by the pulses.

According to a further feature of the present invention, the pulsed laser source is configured to transmit pulses having a strong intensity at a pulse front edge and a reduced intensity at a pulse trailing edge.

According to a further feature of the present invention, the pulsed laser source is configured to vary the frequency of the coherent illumination along the pulse to generate chirped transmitted pulses.

According to a further feature of the present invention, the light pulses are transmitted and the reflected signals received using optical fibers.

According to a further feature of the present invention, the part of the transmitted light pulse directed onto the detector derives from reflections of the optics.

According to a further feature of the present invention, the part of the transmitted light pulse directed onto the detector derives from reflections at the tip of a transmitting fiber.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a where a single detector is used to detect time-multiplexed signals reflected from a plurality of directions.

The principles and operation of coherent range measurement systems according to the present invention may be better understood with reference to the drawings and the accompanying description.

By way of introduction, this invention is based on two principles that can be implemented separately and are most preferably combined in the same system;

A simplified optical arrangement of the coherent system.

A detection time scheme to achieve coherent detection with a simplified receiver.

Figure 1:
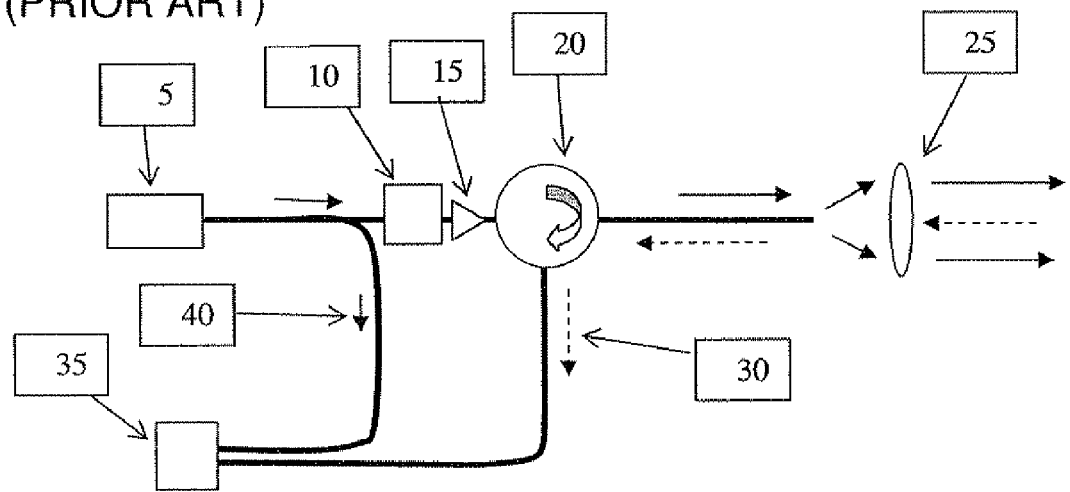
FIG. 1: Prior art coherent range detection system.
Figure 2:
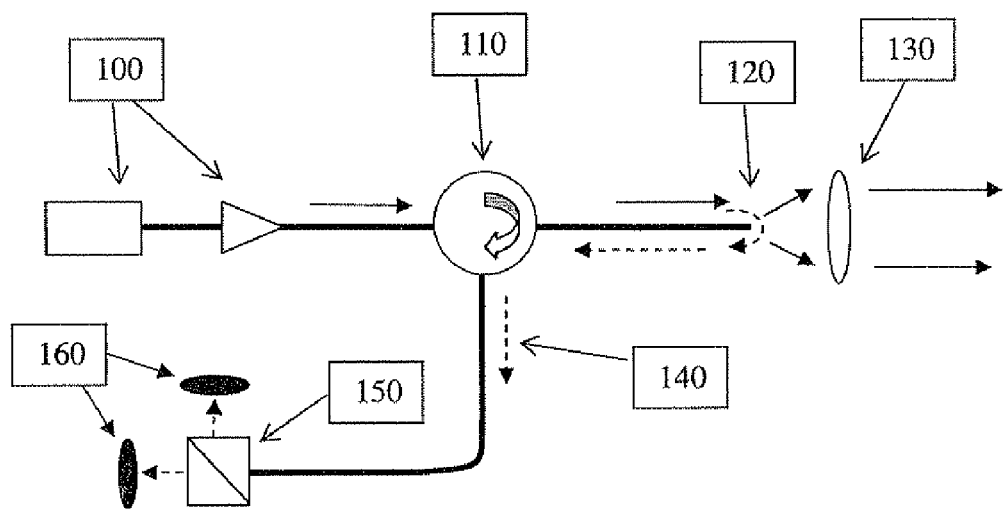
FIG. 2: A schematic description of the transmitter where the reflected light from the pulse transmission is redirected to the detector by a circulator or a coupler to be used as the local oscillator.

It is a well known effect that, when transmitting laser pulses through optical components, some of the light is reflected. In the present invention, this reflected light is used as the local oscillator as depicted in FIG. 2. The fiber laser 100 (depicted as having source and an amplifier) transmits light pulses that pass through a circulator 110. The light is transmitted through the tip of a fiber 120 and being collimated by optics 130. Some of the light is reflected by the tip of the fiber or by the optics into the fiber in the opposite direction (marked as a dashed arrow). This reflected light is redirected 140 by the circulator 110 to the detector to be used as local oscillator. The fibers are preferably single mode. Some improved detection sensitivity can be achieved by using existing coherent detection methods: polarization maintaining fibers, polarizing splitter 150 and a separate detector 160 to each polarization. For simplified (and slightly less sensitive) architecture, a single detector can be used without the polarizing splitter 150. A processing system (not shown, but understood to be present in all embodiments) processes output of the detector to derive range data associated with each of the directions by coherent detection of the reflected signals employing the reflected part of the transmitted pulses as a local oscillator.

Figure 3:
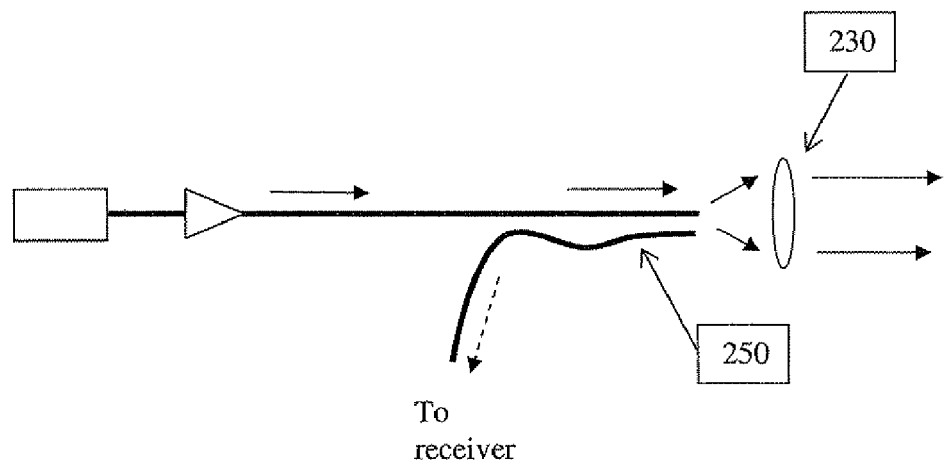
FIG. 3: A schematic description of the transmitter where the reflected light from the pulse transmission is redirected to the detector by a separate optical path to be used as the local oscillator.

Other methods can be used to collect local oscillator light as depicted in FIG. 3. These methods can include a separate optical path such as a fiber 250, that collect only reflected light from the optics. This alternative does not need circulator 110.

Figure 4:
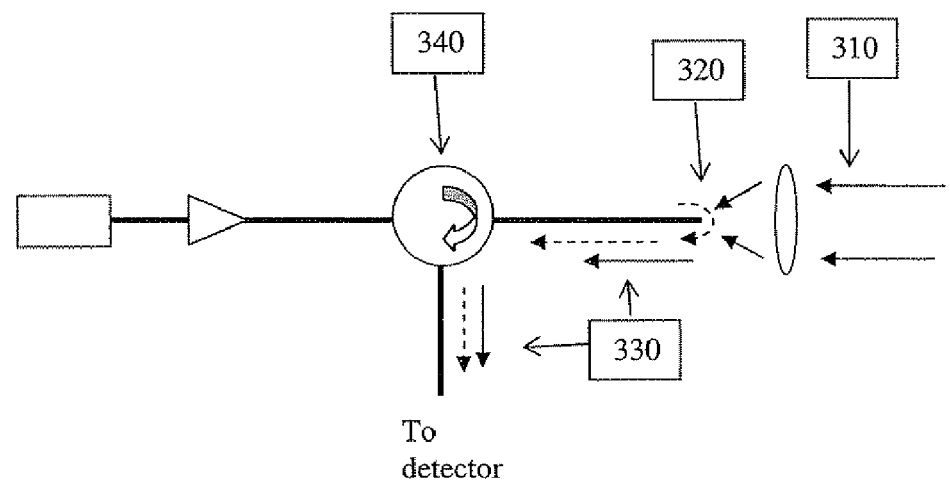
FIG. 4: Reception of the signal through the transmitting optics and co propagation with reflected signal from the optics onto the detector.

Reception of the signal from the target can be made through separate optics or, preferably, through the same optics used to transmit the signal as depicted in FIG. 4. The reflected signal 310 enters the transmission fiber tip 320. From this point the signal co propagates 330 with the reflected local oscillator and is directed to the receiver through circulator 340.

In yet another embodiment of this invention, the optical fiber 250 in the configuration depicted in FIG. 3 serves to collect both the reflected signal from the target and the reflected light from the optics. In this configuration the illumination field of view and the detection field of view must be overlapping to some degree.

Figure 5:
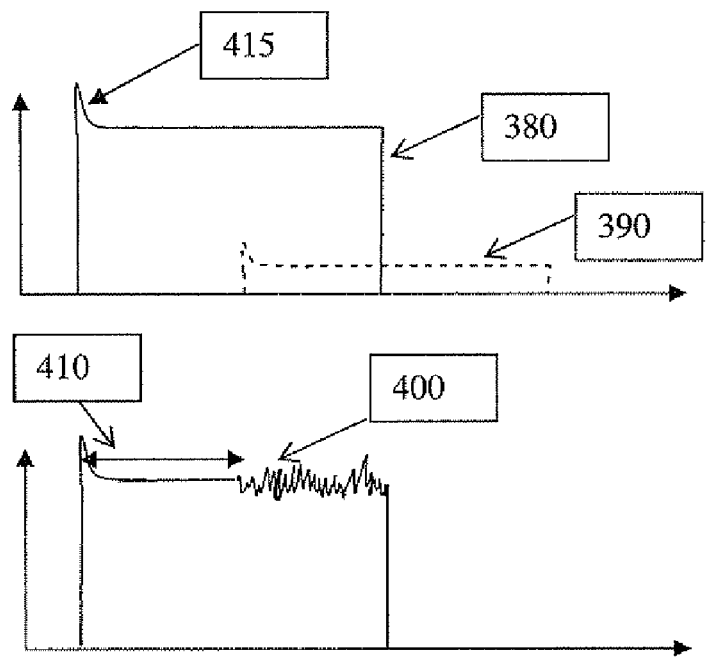
FIG. 5: Time scheme description of coherent detection according to this invention.

The time scheme needed to achieve coherent detection, according to this invention, is based on interfering energy from the transmitted pulse (used as local oscillator) on its reflected image (signal) as depicted in FIG. 5. The vertical axis represents the intensity detected in arbitrary units and the horizontal axis represents time in arbitrary units. The original laser pulse which was reflected (140 in FIG. 2) and detected 380, interferes with the signal (330 in FIG. 4) 390 which is time delayed because of the time-of-flight of the pulse to the target and back. In practice the signal is too weak to be detected directly; however, its interference 400 with the local oscillator can be detected. The time interval 410 between the start of the local oscillator and the start of the interference determines the pulses time-of-flight and therefore the range to the target. Some lasers can be designed to produce strong spike 415 at the front of the pulse and reduced intensity at its trailing edge. Introducing this laser capability into this architecture improves signal rise time detection and is included in this invention.

This method enable to deduce the range directly from the signal detected while in prior art methods the range is deduced from comparison between the time of modulating the electronics and the time the signal was received.

Figure 6:
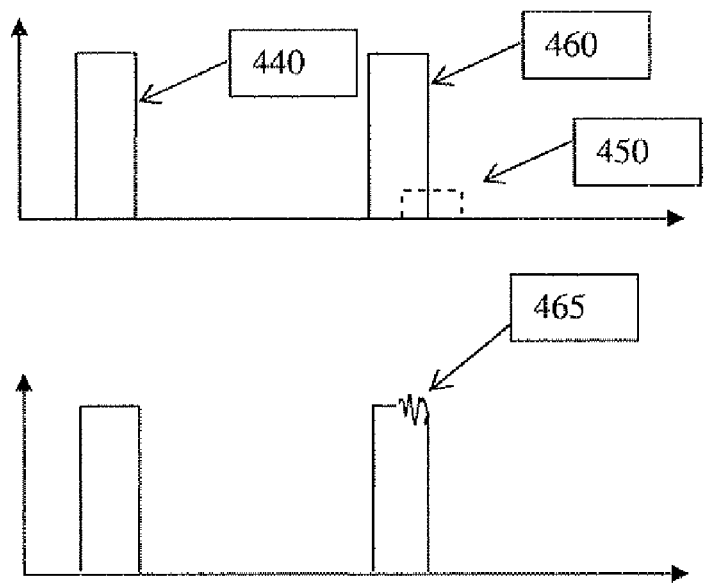
FIG. 6: Time scheme description of coherent detection according to this invention where one pulse is transmitted in order to generate the signal and a second pulse is transmitted in order to generate the local oscillator.

In yet another embodiment of this invention the time scheme is based on pulses as depicted in FIG. 6. In this figure the axis are the same as in FIG. 5. In this embodiment a first pulse 440 is transmitted in order to generate the signal 450 from the target and a second pulse 460 is transmitted in order to generate the local oscillator for the interference detection 465. In this embodiment there is no need for very long pulses if the target is far. This transmission process can be made repeatedly so every transmitted pulse generates the local oscillator for the signal originated from an arbitrarily previously transmitted pulse (not necessarily in running order). Optionally, a pulsed laser source with controllable pulse rate may be used and the rate adjusted dynamically to ensure that a local oscillator pulse is available overlapping the beginning of each reflected signal pulse. According to a further optional feature, the pulses from the laser may be transmitted in a known pattern, for example, suppressing one pulse every given number of cycles, so as to ensure that the reflected signals can be unambiguously associated with a given transmitted pulse.

Figure 7:
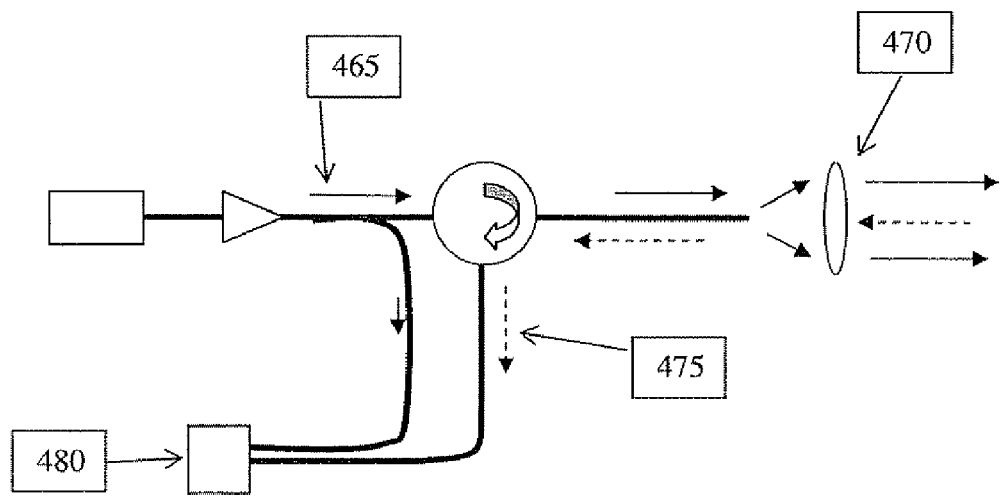
FIG. 7: An optical arrangement for coherent detection where the local oscillator is generated by coupling small amount of the transmitted pulse onto the coherent deceiver

The method presented in this invention of using small amount of energy of the transmitted pulse as the local oscillator, can also be realized in the architecture presented in FIG. 7 which is more complicated but more efficient. The pulses of light that where generated by the laser pass through a coupler 465 that enable most of the energy to continue to propagate to be transmitted though the optics 470. The received signal is redirected 475 to the receiver 480. The coupler 465 also couple small amount of pulse energy directly to receiver 480. In this embodiment of the invention, the receiver can include all methods used in prior art coherent receivers, including balanced receivers and polarizer. It is to be emphasized that unlike prior art coherent systems that use continuous or different light source as the local oscillator, in this invention energy of the transmitted pulse is used for this purpose.

It is known that linear change or modulation of the frequency of the transmitted pulse and of the local oscillator can generate a shift of the interfering frequency. In all embodiments of this invention, a chirping method can be applied.

One method to apply chirping is by directly modulating the laser source. This process of direct modulation is known to introduce linear wavelength change ("chirp") that produces the desired shift of interfering frequency.

Many modulation schemes are known and used in coherent detection (for example phase modulation). All applications of these methods while using some of the transmitted signal as local oscillator are included in this invention.

Figure 8:
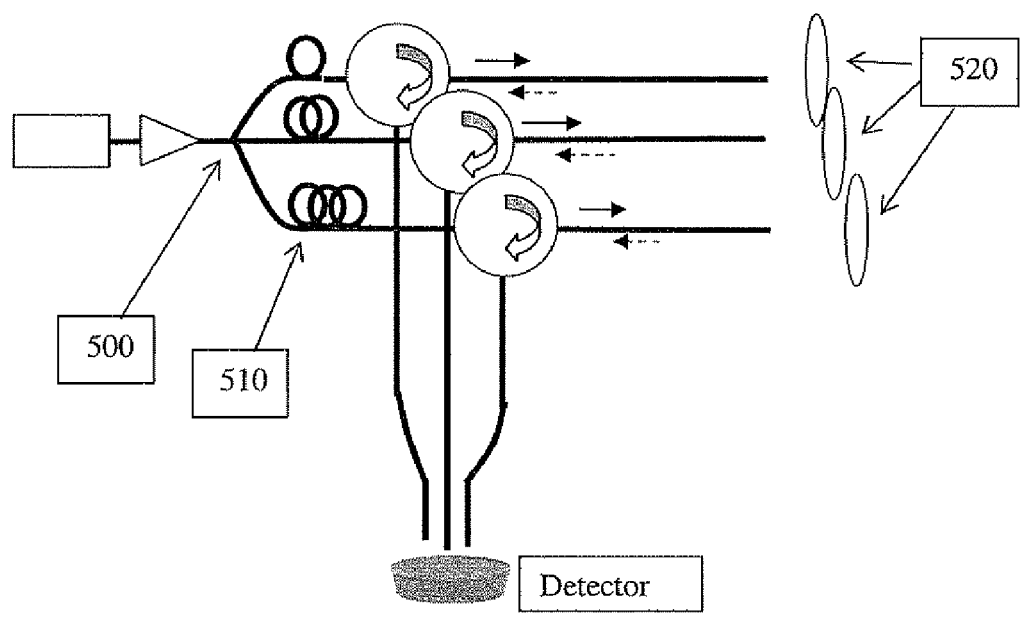
FIG. 8: a multiplied coherent range detection system based on a single detector.

The simplified optical architecture of this invention enables scaling the single transmitter/receiver module to a few modules with minimal complexity and price as depicted in FIG. 8. The lasers pulses are split into a plurality of fibers, in this case three fibers, using a fiber splitter 500. The pulses are then delayed by different amounts using delay fibers 510. The delay fibers can be introduced at any point along each optical channel and not necessarily before the circulator as shown in this figure. The light from the fibers passes through optics 520 and propagates in different directions to illuminate different points on the target. As before, each fiber carries a reflected portion of the illumination pulse, serving as a local oscillator, and any reflected signal received from the target.

The optics 520 can be separate as depicted in this figure or may be common to all of the fibers.

The reflected signal from all of the optical channels are directed onto the same receiver. As in the single channel description, the receiver can be based on different architectures as commonly used in coherent detection systems (single detector, detector for each polarization or balanced receiver).

In yet another embodiment the separate time delayed pulses are generated using different lasers transmitting at different times instead of the splitter 500 and the time delay fibers 510.

Figure 9:
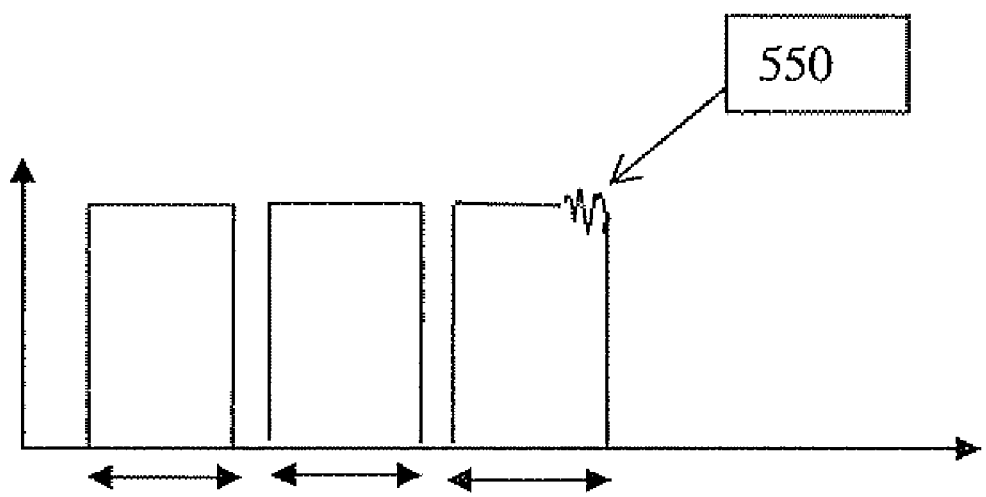
FIG. 9: Time scheme description according to the method depicted in FIG. 4 and the optical setup described in FIG. 8.

The delay of each channel enables the system to identify the direction of the detected signal as depicted in FIG. 9. In this figure the axes are the same as in FIG. 5. Three transmitted pulses are described while each pulse has its own time slot. In this example, only the last pulse detected a signal 550.

In this configuration it is important to prevent time overlapping between the various local oscillators as they reach the detector. Preferably, each local oscillator is used to detect the reflected signal from the corresponding transmitted pulse. In this case, the reflected local oscillator and received reflected signal are inherently propagating along the same fiber, ensuring maximal detection sensitivity. Local oscillators from other fibers incident on the detector typically provide much less sensitive detection due to misalignment of the ray paths. If it is desired to employ the signal generated by one channel to interfere with the local oscillator generated by a different channel, the channels should preferably be combined using suitable fiber junctions. In such a case, the illumination from the various channels falling on the detector must also be uniform in terms of intensity and phase.

In general, a few system considerations should be considered in order to achieve optimal system performance;

Optimal range detection can be achieved when the transmitted pulse has a sharp rise time.

Multiple reflections from various optical components back into the detector introduce interference noise which will mask the signal interference. It is therefore desirable to optically reduce these undesired reflections. It is also most efficient to use lasers having coherence length longer then the optical path difference of these parasitic interference sources (few centimeters), this way the interference with this parasitic reflections will be at constant phase and will not introduce noise.

It will be appreciated that the above descriptions are intended only to serve as examples, and that many other embodiments are possible within the scope of the present invention as defined in the appended claims.

What is claimed is:

1. A coherent range measurement system comprising:
   (a) an optical arrangement defining a current optical field of view;
   (b) an illumination subsystem configured for transmitting a pulse of coherent illumination from a pulsed laser source along a plurality of transmitter optical fibers including delay loops of differing lengths to transmit pulses at different times along each of a plurality of transmission directions within said current optical field of view;
   (c) a detection arrangement including:
       (i) a detector sensitive to said coherent radiation, and
       (ii) detector optical fibers associated with said transmitter optical fibers and configured to direct part of said transmitted pulses derived from each of said transmitter optical fibers at a location after said delay loops and a reflected signal from each of said directions onto said detector; and
   (d) a processing system associated with said detection arrangement and configured to process an output of said detector to derive range data associated with each of said directions by coherent detection of said reflected signals employing said part of said transmitted pulses as a local oscillator.

2. The coherent range measurement system of claim 1, wherein said pulses of coherent illumination transmitted along said plurality of directions originate from a single pulsed laser source.

3. The coherent range measurement system of claim 1, wherein said pulsed laser source is configured to transmit pulses having a strong intensity at a pulse front edge and a reduced intensity at a pulse trailing edge.

4. The coherent range measurement system of claim 1, wherein said pulsed laser source is configured to vary the frequency of the coherent illumination along the pulse to generate chirped transmitted pulses.

5. The coherent range measurement system of claim 1, wherein said part of the transmitted light pulse directed onto said detector derives from reflections from said optical arrangement.

6. The coherent range measurement system of claim 1, wherein said part of the transmitted light pulse directed onto said detector derives from reflections at the tip of said transmitter optical fibers.

7. The coherent range measurement system of claim 1, wherein said part of said transmitted pulse and said reflected signal for each transmission direction propagate along a single one of said detector optical fibers towards said detector.

* * * * *